United States Patent [19]

Ottow

[11] Patent Number: 4,569,436
[45] Date of Patent: Feb. 11, 1986

[54] APPARATUS FOR CONVEYING PARTICULATE SOLIDS

[75] Inventor: Manfred Ottow, Berlin, Fed. Rep. of Germany

[73] Assignee: Metallgesellschaft Aktiengesellschaft, Frankfurt am Main, Fed. Rep. of Germany

[21] Appl. No.: 501,299

[22] Filed: Jun. 6, 1983

[30] Foreign Application Priority Data

Jun. 5, 1982 [DE] Fed. Rep. of Germany ....... 3221308

[51] Int. Cl.[4] .............................................. B65G 27/00
[52] U.S. Cl. ...................................... 198/771; 34/164
[58] Field of Search ............... 34/164, 57 A; 198/766, 198/770, 771, 752; 366/114, 115

[56] References Cited

U.S. PATENT DOCUMENTS

| | | | |
|---|---|---|---|
| 2,134,091 | 10/1938 | Stecher | 198/771 X |
| 2,277,067 | 3/1942 | Brassert | 75/10 R |
| 2,795,318 | 6/1957 | Morris | 198/771 X |
| 3,089,688 | 5/1963 | Ostberg | 34/164 |
| 4,140,215 | 2/1979 | Musschoot | 198/771 |
| 4,305,210 | 12/1981 | Christensen et al. | 34/164 X |

FOREIGN PATENT DOCUMENTS

| | | |
|---|---|---|
| 537297 | 10/1931 | Fed. Rep. of Germany . |
| 850571 | 7/1949 | Fed. Rep. of Germany . |
| 1942332 | 2/1972 | Fed. Rep. of Germany . |
| 2207225 | 9/1973 | Fed. Rep. of Germany . |
| 2505202 | 8/1975 | Fed. Rep. of Germany . |
| 2410328 | 9/1975 | Fed. Rep. of Germany . |
| 2410344 | 9/1975 | Fed. Rep. of Germany . |
| 2410345 | 9/1975 | Fed. Rep. of Germany . |
| 1225899 | 3/1971 | United Kingdom . |
| 395685 | 12/1973 | U.S.S.R. ................................ 34/164 |

OTHER PUBLICATIONS

Untersuchungen zum Fordervorgang auf Schwingrinnen (1. Teil), Investigations into Handling with Vibrating Conveyors, by Dr. Ing. K. H. Wehmeier from Handling, Conveying, Automation, pp. 317-327.

Primary Examiner—Robert J. Spar
Assistant Examiner—Jonathan D. Holmes
Attorney, Agent, or Firm—Karl F. Ross; Herbert Dubno

[57] ABSTRACT

Linear vibratory motion is imparted to two mutually opposite plates, which are connected to each other. As a result, conveying impulses are applied to solid particles. To permit chemical or physical processes to be carried out with fluids flowing in cocurrent or countercurrent streams and to effect a transfer of material or heat at a high rate during the vibratory conveyance or to disintegrate or compact the solid particles, conveying pulses are imparted to the particles by both plates and the solids occupy in a state of rest only part of the free space between the two plates.

1 Claim, 8 Drawing Figures

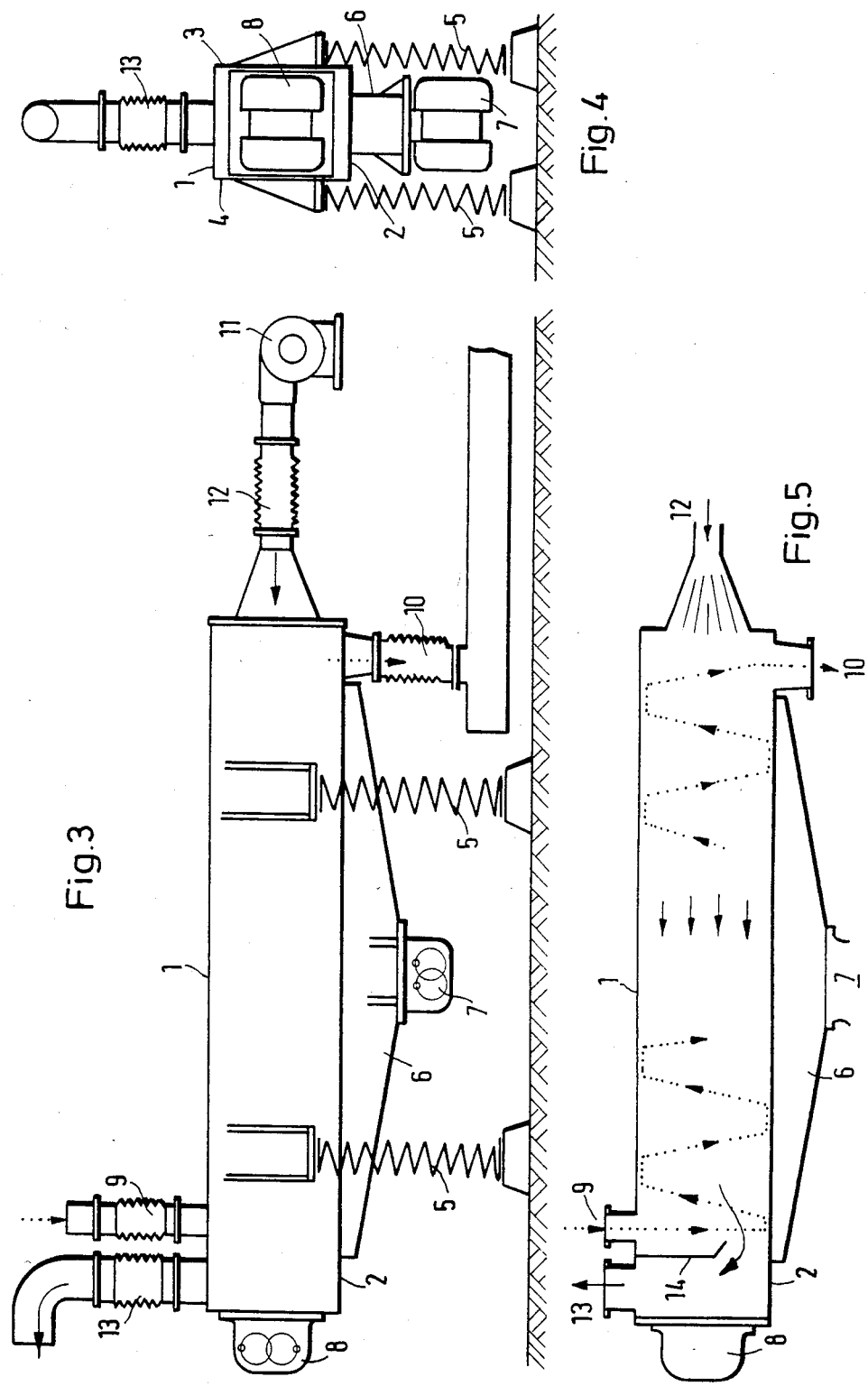

APPARATUS FOR CONVEYING PARTICULATE SOLIDS

FIELD OF THE INVENTION

This invention relates to apparatus for conveying particulate solids between two mutually opposite plates, which are connected to each other, wherein linear vibratory motion is imparted to the two plates to apply conveying impulses to the solid particles. My invention also relates to apparatus for effecting contact between a particulate solid and a fluid phase, e.g. to effect a reaction between them.

BACKGROUND OF THE INVENTION

It is known to convey particulate solids with vibratory conveyors. Most vibratory conveyors comprise a vibratory conveyor trough, which is resiliently supported or resiliently suspended.

Vibratory motion is imparted to the trough by a force acting on the bottom of the trough in a direction which is at an acute angle to the longitudinal direction of the trough. That force is generated by rotating unbalance members, eccentric members or electromagnetic actuators and accelerates the trough in horizontal and vertical directions. These accelerations result in an acceleration vector, which includes an acute angle with the direction of conveyance.

The vertical acceleration must exceed the acceleration due to gravity so that the solid particles will separate from the trough and perform a ballistic movement in the direction of conveyance. The troughs may be open-topped or they may be covered so that an escape of dust will be prevented or chemical reactions with gases can be carried out. The cover does not influence the conveying motion of the solid particles. (Open German Application DE OS No. 25 05 202, German patent publication DE AS No. 22 07 225, Open German application DE OS No. 24 10 328, Open German application DE OS No. 24 10 344, Open German application DE OS No. 24 10 345, U.S. Pat. No. 2,277,067, "Fördern und Heben", 1961, pages 317 to 327).

The acceleration vector which includes an acute angle with the direction of conveyance may alternatively be produced in that the trough is subjected to separate accelerations in a vertical direction and in a direction which is parallel to the direction of conveyance. The direction of conveyance can be reversed by a reversal of the polarity of the vibrators acting in a direction which is parallel to the direction of conveyance (Open German application DE OS No. 19 42 332).

Such vibratory conveyor troughs may also be used to effect an upward or downward conveyance up to a certain angle but they cannot be used for an upward or downward vertical conveyance. An upward vertical conveyance can be effected only with helical troughs or in pipes provided with internal fixtures (U.S. Pat. No. 4,140,215).

British patent specification No. 1,225,899 describes a conveyor which consists of two concentrical tubes whereby the annular space between the tubes is divided into a plurality of channels by means of radially arranged walls. The open lower end of the conveyor is immersed into a bed of the material to be conveyed. Linear oscillations are imparted to the conveyor parallel to the axis of the tubes and torsional oscillations across the axis. The channels are filled in a state of rest over the entire cross section with the material. By means of the angular accelerations of the torsional oscillatory motions the material is forced towards the walls of channels and the material is moved upwardly by means of the linear oscillations.

Vibratory conveyor troughs can mainly be used to convey materials. They are not well suited for carrying out chemical or physical processes in which gases are conducted in covered troughs to flow cocurrently or countercurrently to the direction of conveyance because the transfer of material and heat takes place mainly on the surface of the bed of solids and does not affect the entire cross section of that bed. A flow of gases through the entire bed in transverse streams passing through perforated bottoms disposed under the bed would require a relatively high structural expenditure and in that case it is not possible to provide for a countercurrent or cocurrent flow of the gases, which is often desired.

OBJECTS OF THE INVENTION

It is the primary object of this invention to provide an improved apparatus for conveying particulate solids whereby the drawbacks of the above-described techniques are avoided.

Another object of the invention is to provide apparatus for effecting interaction between a particulate solid and a fluid, especially a gas, with improved material and/or thermal exchange.

It is also an object of the invention to avoid these disadvantages and particularly to permit a vibratory conveyance in which chemical or physical processes are carried out which involve fluids flowing countercurrently or cocurrently with respect to the direction of conveyance and in which a transfer of material and heat is effected at high rates or in which the solid particles are disintegrated or compacted.

SUMMARY OF THE INVENTION

This object is accomplished in accordance with the invention in that the conveying impulses are applied to the solid particles by both plates and the solids occupy in a state of rest only part of the free space between the two plates.

In a direction which is normal to the plates, the solid particles are so highly accelerated that they impinge on the opposite plate and that they are accelerated by both plates in alternation. The acceleration which is required will depend on the spacing of the plates. The two plates are generally arranged in parallel planes and may be inclined at any angle or extend in vertical planes. The two plates are usually gastightly connected by side walls so that also in processes in which no gas is supplied no dust will escape. Chemical and/or physical processes can be carried out during the conveyance. For instance, the particles may be compacted or caused to agglomerate as they impinge on the two plates.

Thus it is important to the invention that the impetus in the conveying direction is transferred to the particles not only by the plate upon which the particles can rest under the action of gravity, but also by the plate against which the particles are thrown against the action of gravity and against which they are held by momentum/inertia after having been cast thereagainst by the force impulse which acts counter to the gravitational force.

Unlike covered troughs, therefore, in which the cover plays no role in the actual impetus to the particulate solid, the two-plate system of the invention intentionally disposes the upper plate so that it will intercept the upwardly moving particles and will impart a velocity component to them in the direction of conveyance.

According to a preferred further feature, vibratory motions at defined frequencies and with amplitudes which are normal and parallel, respectively, to the direction of conveyance of the solid particles are imparted to the plates. If the vibrations are generated separately, the mechanical stresses will be reduced and an effective control resulting in optimum handling and process conditions will be permitted.

According to another feature of the invention, the ratio of the frequencies of the parallel and normal vibratory motions is about 2:3. With that ratio, each solid particle which has impinged on a plate remains in contact with that plate for a short time and will be carried along by the plates to some extent in the direction of conveyance before the particle is thrown back. In a countercurrent process that drag effect is particularly important because it opposes a backdrifting of the particles.

According to still another feature of my invention, the solids occupy in a state of rest less than 30% and preferably less than 10% of the free space between the two plates. This produces particularly good results in chemical or physical processes.

Advantageously a fluid is conducted through the space between the plates in a cocurrent (codirectional flow) or countercurrent with respect to the direction of conveyance of the solids. The fluid may consist of gases, vapors or liquid and excellent transfer of material or heat can be effected.

In this manner, chemical processes, such as the direct reduction of iron ore to produce sponge iron, the devolatilization of oil shale or oil sand, and the roasting of sulfide ores etc., or the heating or cooling of the solids may be effected if the chemical composition and the temperature of the fluids are properly selected. Whereas the solids may also be indirectly heated or cooled, this would require a larger vibrating mass.

A plurality of charging openings and discharge openings for the solids and a plurality of gas inlets and gas outlets in the plates or in walls flanking the travel path may be provided so that the processes can be carried out under optimum conditions.

According to a preferred further feature at least one partition having through holes for the passage of the accelerated solid particles is provided between the plates. The through holes are spaced apart and extend transversely to the direction of conveyance and suitably consist of slots. In that arrangement, conveying impulses will be applied by two opposite plates also to the smaller solid particles of solids having a larger particle size range even if the amplitude of the vibration that is at right angles to the direction of conveyance is not otherwise sufficient to throw these particles from one of the outer plates to the other.

BRIEF DESCRIPTION OF THE DRAWING

The above and other objects, features and advantages of the present invention will become more readily apparent from the following description, reference being made to the accompanying drawing in which:

FIG. 3 is a side elevation showing apparatus for carrying out the process according to the invention;

FIG. 4 is an elevation of the apparatus shown in FIG. 3, viewed from the left;

FIG. 5 is a longitudinal sectional view showing the apparatus of FIG. 3 and indicates how the solid particles and the gas move countercurrently;

SPECIFIC DESCRIPTION

Figure 1:
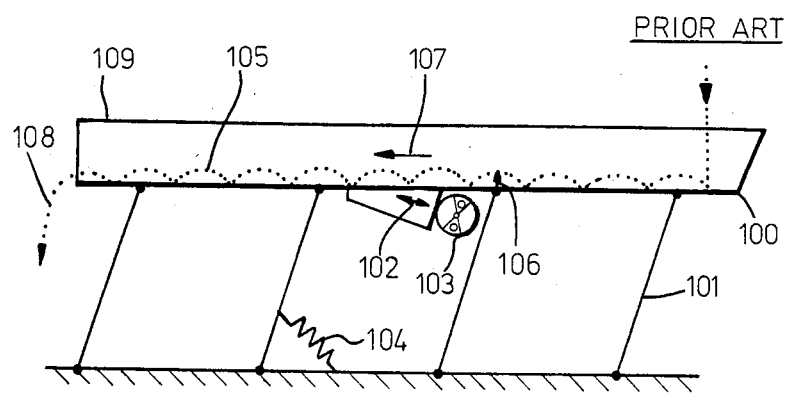
FIG. 1 in diagrammatic side elevation shows a known vibratory conveyor trough and indicates the motion imparted to the solid particles in that trough.

In FIG. 1 I have diagrammatically shown a conventional open-top trough 100 which is mounted as represented by the links 101 to undergo a reciprocatory motion generally as represented by the arrow 102 as generated by a rotating imbalance weight represented at 103, a spring 104 representing the restoring force against which the imbalance weight acts.

As will be apparent from the motion of the solid particles represented by the dotted line 105, an antigravitational impetus 106 is imparted to the particles to lift them slightly from the floor of the trough, while a horizontal component 107 is imparted to them to throw them forwardly in a conveying direction from right to left, until the particles are discharged at 108 over the downstream edge of the trough.

It will be apparent there that an antigravitational or levitating impulse is usually insufficient to cast the particles anywhere near the upper edge 109 and the trough so that even if the trough is covered, the cover does not contribute anything at all to the impetus in the direction of the vector 109.

Figure 2:
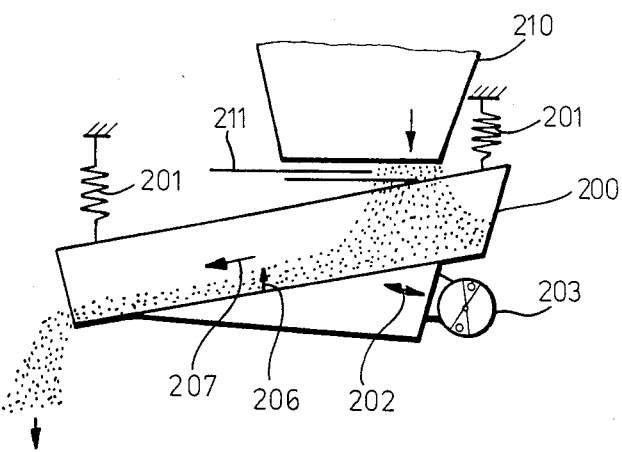
FIG. 2 in diagrammatic side elevation shows a known vibratory conveyor trough designed to discharge solids from a bin.

A similar action is generated by the vibrating trough 200 of FIG. 2 which is disposed beneath a bin 210 and receives a controlled flow of particles as metered by a shutter arrangement represented diagrammatically at 211. Here the trough is resiliently suspended, e.g. by springs 201, so as to have a downward inclination and is vibrated in the direction of arrow 202 by the rotating imbalance weight so that an advance component is in the direction of the vector 207 and a component 206 of the force is imparted to the particles normal to the bottom of the conveyor trough, i.e. perpendicular to this bottom.

Here again, even if the trough is covered, there is no impetus supplied by the cover to the particles in the direction of the vector 207.

In the apparatus shown in FIGS. 3–5 the two plates 1 and 2 are parallel to each other and are gastightly connected to each other by the side walls 3, 4. Resilient supports 5 are secured to the side walls 3, 4. A stiffener 6 is disposed under the plate 2. A vibrator 7 is secured to that stiffener and generates vibrations which are at a defined frequency and have an amplitude that is at right angles to the direction of conveyance. A vibrator 8 is mounted on the end wall and generates vibrations which are at a predetermined frequency and have an amplitude that is parallel to the direction of conveyance. The solids are charged through the flexible charging device 9 and are discharged through the flexible discharging device 10. Gas is blown by the blower 11 through the flexible feed conduit 12 to flow countercurrently to the solids and is withdrawn through the flexible withdrawing device 13. A deflecting plate 14 is provided between the device 9 for charging the solids and the device 13 for withdrawing the gas.

Figure 6:
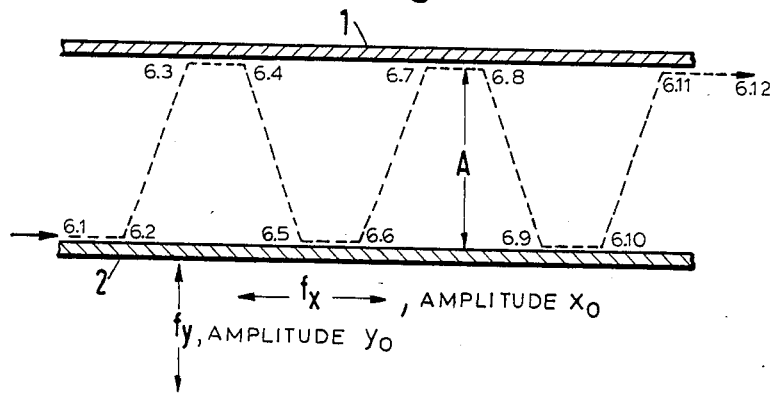
FIG. 6 shows the conveying motion of the solid particles without a gas stream.

In FIG. 6, $f_y$ designates the frequency and $y_o$ designates the amplitude of the vibration which is normal to the direction of conveyance of the solid particles, and $f_x$ and $x_o$ designate the frequency and the amplitude, respectively, of the vibration which is parallel to the direction of conveyance. Successive locations are represented at 6.1–6.12, respectively. Each of the amplitudes $y_o$ and $x_o$ acts in two directions. The frequency ratio $f_x:f_y$ is 2:3. The distance between the plates 1 and 2 is designated A. Along the path section 6.1–6.2, the solid particle is in contact with the plate and is dragged to the right by the plate 2 owing to the horizontal movement of that plate. At point 6.2, that particle is thrown by the plate 2 to the plate 1 and impinges on the latter at 6.3 and is dragged by the plate 1 to point 6.4 and is then thrown by the plate 1 to the plate 2.

Figure 7:
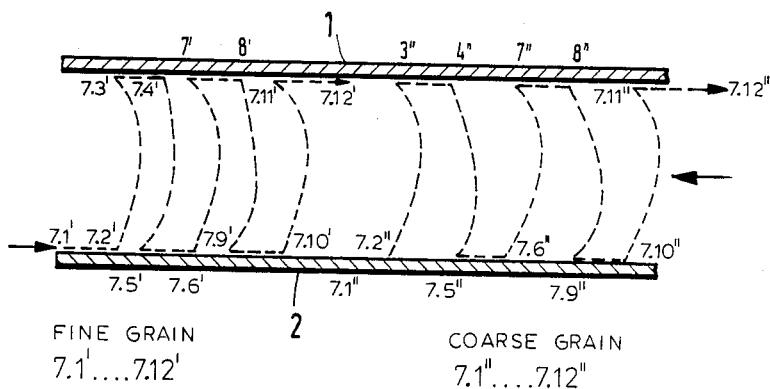
FIG. 7 indicates the conveying motion of the solid particles which are acted upon by a countercurrent gas stream.

In accordance with FIG. 7 where the locations are represented at 7.1–1.12′ and 7.1″–7.12″, the paths of the solid particles are curved as a result of the action of the gas stream. The paths of the small particles are shown in the left-hand half of those of larger particles in the right-hand half.

Figure 8:
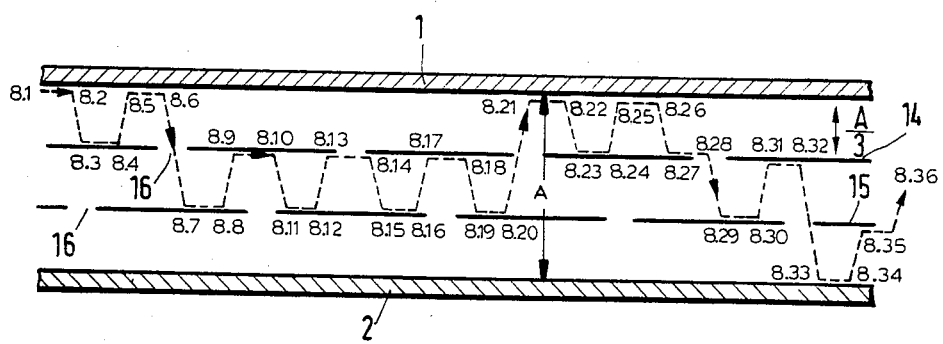
FIG. 8 illustrates the conveying motion of the solid particles in an apparatus provided with partitions.

FIG. 8 shows the motion of particles between the plates 1, 2 and two partitions 14, 15, which are formed with slots 16. The locations along the path are shown at 8.1–8.36. It will be sufficient if the amplitude $x_o$ of the vibrations which are at right angles to the direction of conveyance is so large that the impulses applied to the small particles will cause them to impinge on the adjacent partition 14 or 15. For instance, if the impulse applied by the plate 1 at point 8.6 to a large particle is sufficient to throw it to point 8.7 of the partition 15 whereas the impulse will not be sufficient to throw also smaller particles to point 8.7, the smaller particles will impinge on the top or bottom surface of the partition 14 and will then be accelerated by the latter.

In each of the structures shown in FIGS. 3, 6, 7 and 8, an initial impetus is provided for the particles away from the lower surface upon which the particles come to rest and in the direction of another surface juxtaposed with the first sufficiently closely with this other surface, e.g. the upper surfaces 1 in FIGS. 3, 6 and 7 or the upper surface 1 and any of the surfaces of the partitions 14 and 15 above a surface 2, 15 or 14 upon which the particles previously come to rest under the action of gravity. When this upper surface intercepts the upwardly moving particles it imparts to them an impetus in the conveying direction or left to right in FIGS. 5–8, to supplement the impetus in this direction imparted by the resting surface from which the particles were thrown. Thus for each crossing of the gap between lower and upper surfaces, impetuses in the conveying direction are imparted at both extremities of the path and this applies as well to the passage from each upper surface to the lower surface onto which the particles fall.

The advantages afforded by the invention reside mainly in that the solid particles are very effectively distributed throughout the cross section, high relative velocities between the solid particles and the fluid are obtained so that a very effective reaction can be achieved in an economical manner with fluids which flow countercurrently or cocurrently with respect to the solids, an effective heat transfer is permitted and the particles can be compacted or agglomerated.

I claim:

1. An apparatus for conveying a particulate solid which comprises:
    means defining a conveyance path for said solids including a lower plate and an upper plate spaced above said lower plate and defining a space therebetween containing particles of said solid in a quantity such that the solids occupy in a state of rest only part of said space;
    means connected to said plates for imparting oscillation thereto with a component tending to throw said particles from said lower plate against said upper plate and sufficient to impart to at least some of said particles sufficient motion to bring them into contact with said upper plate, and a component in a conveyance direction along said path whereby said particles receive impetus in said conveyance direction upon each contact with said upper and said lower plates; and
    at least one partition in said space parallel to said plates and provided with openings spaced apart in said conveyance directions such that said partition intercepts particles moving from one of said plate toward the other of said plates and additionally applies impetus in said conveyance direction to the intercepted particles.

* * * * *